US008966007B2

(12) United States Patent
Lee

(10) Patent No.: US 8,966,007 B2
(45) Date of Patent: Feb. 24, 2015

(54) METHOD AND APPARATUS FOR PROVIDING WEB CONTENTS

(75) Inventor: Sang-Bum Lee, Goyang-si (KR)

(73) Assignee: KT Corporation, Seongnam-si (KR)

( * ) Notice: Subject to any disclaimer, the term of this patent is extended or adjusted under 35 U.S.C. 154(b) by 194 days.

(21) Appl. No.: 13/608,524

(22) Filed: Sep. 10, 2012

(65) Prior Publication Data

US 2014/0074967 A1 Mar. 13, 2014

(51) Int. Cl.
 G06F 15/16 (2006.01)
(52) U.S. Cl.
 USPC ............................................. 709/217; 709/245
(58) Field of Classification Search
 CPC ................ H04M 1/72583; H04M 2250/22; H04L 41/50
 USPC .................... 709/217, 218–219, 245
 See application file for complete search history.

(56) References Cited

U.S. PATENT DOCUMENTS

| 6,023,698 | A * | 2/2000 | Lavey et al. ........................... 1/1 |
| 7,395,534 | B2 * | 7/2008 | Alcazar et al. ................. 717/174 |
| 2010/0233996 | A1 * | 9/2010 | Herz et al. ..................... 455/411 |
| 2011/0252415 | A1 * | 10/2011 | Ricci ............................... 717/173 |
| 2013/0031512 | A1 * | 1/2013 | Liu .................................. 715/835 |
| 2014/0032656 | A1 * | 1/2014 | Hyman et al. ................. 709/204 |

FOREIGN PATENT DOCUMENTS

| JP | 2003-256366 A | 9/2003 |
| JP | 2004-139357 A | 5/2004 |
| JP | 2004-530958 A | 10/2004 |

* cited by examiner

Primary Examiner — Ruolei Zong
(74) Attorney, Agent, or Firm — Sughrue Mion, PLLC

(57) ABSTRACT

A web contents providing apparatus which includes a web contents registration unit configured to register a plurality of web contents, and configured to map a URL address and an identification code onto each registered web contents, a web application generator configured to generate, in response to a request to download a hybrid application from a device of an authenticated user, the hybrid application including URL addresses corresponding to registered web contents based on user information of the authenticated user and the mapped identification codes, and a web application transmitter configured to transmit the generated hybrid application to the device of the authenticated user or to a web application providing server.

19 Claims, 5 Drawing Sheets a. DOWNLOADING HYBRID APPLICATION FROM APPLICATION STORE b. DISPLAYING A PLURALITY OF ICON GROUPS IN CASE OF SELECTING HYBRID APPLICATION c. DISPLAYING A PLURALITY OF ICONS IF ANY ONE OF THE ICON GROUPS IS SELECTED DISPLAYING WEB CONTENTS BY USING THE MAPPED URL IN CASE OF SELECTING ANY ONE OF ICONS

FIG. 5
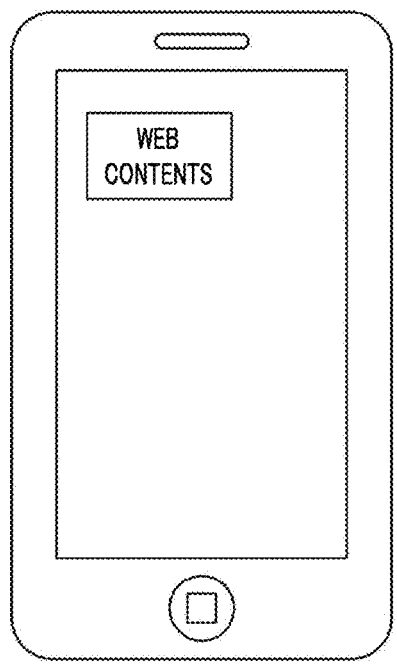
a. DOWNLOADING HYBRID APPLICATION FROM APPLICATION STORE
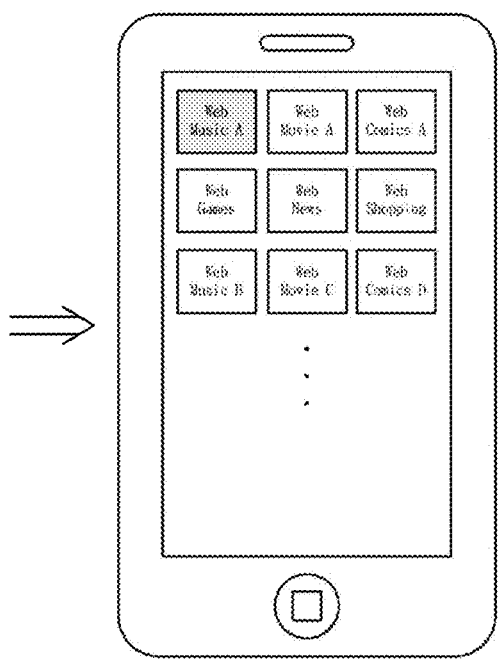
b. DISPLAYING A PLURALITY OF ICON GROUPS IN CASE OF SELECTING HYBRID APPLICATION
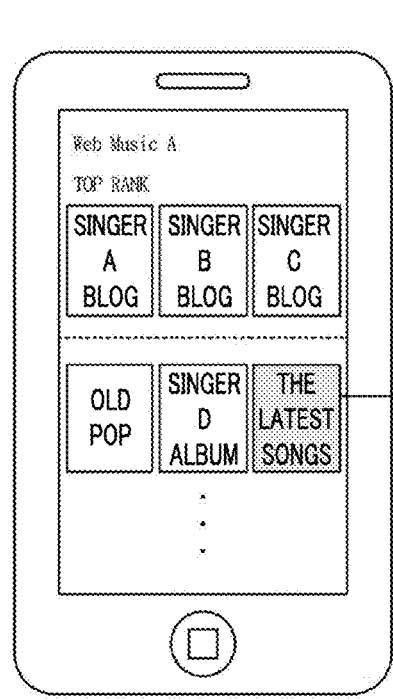
c. DISPLAYING A PLURALITY OF ICONS IF ANY ONE OF THE ICON GROUPS IS SELECTED
DISPLAYING WEB CONTENTS BY USING THE MAPPED URL IN CASE OF SELECTING ANY ONE OF ICONS

METHOD AND APPARATUS FOR PROVIDING WEB CONTENTS

BACKGROUND

1. Field

Exemplary embodiments broadly relate to a method and an apparatus for providing web contents, and in particular, to a method and an apparatus for providing web contents through management of code-based URLs.

2. Description of the Related Art

Recently, with the proliferation of smart phones, various applications for the smart phones have been developed and produced.

Users of the smart phones download various applications on their smart phones by using an application store or others, from which applications can be downloaded for free or with a payment of a certain amount of money.

If an application previously downloaded on a smart phone has been updated, all functions of the application need to be updated in the smart phone. In this case, however, there has been a problem of an increase in time and an increase in an amount of data, which are required to update the application. Thus, updating applications using this technique is inconvenient and inefficient for the users.

SUMMARY

Accordingly, it is an aspect to provide a method and an apparatus, which enable only a URL address to be changed when web contents are updated, so that an update can be executed quickly from the perspective of the users, and web contents can be easily changed from the perspective of the developers.

Another aspect is to provide a method and an apparatus, which enable use of various web contents by downloading a single web application.

According to an aspect of exemplary embodiments, there is provided an apparatus for providing web contents. The apparatus includes a web application generator configured to generate, if a request to download a hybrid application is received from a device of a user, the hybrid application including URL addresses corresponding to web contents based on user information and identification codes mapped to the web contents and a web application transmitter configured to transmit the generated hybrid application to the device of the user or to a web application device.

According to yet another aspect of exemplary embodiments, there is provided a method of providing web contents. The method includes generating at least two first icons, each including a URL address and an identification code corresponding to web contents, generating one or more second icons, each of which groups said at least two generated first icons by pre-set categories, generating a hybrid application including the one or more second icon, and transmitting the hybrid application to a user device.

According to yet another aspect of exemplary embodiments, there is provided a method of providing web contents. The method includes transmitting a request to download a hybrid application including URL addresses corresponding to a plurality of web contents, receiving the hybrid application and an input indicating a selection of the hybrid application, displaying a plurality of icon groups provided by the selected hybrid application, displaying a plurality of icons included in a selected icon group if one of the plurality of icon groups is selected and receiving a web page corresponding to a URL address mapped to the selected icon and displaying the web page if one of the plurality of icons is selected, wherein the hybrid application is generated based on user information and identification codes of the web contents.

An exemplary embodiment may provide various user-customized web contents.

Further, when web contents are updated, an exemplary embodiment may provide the updated web contents by only changing a URL address, so that update can be executed quickly from the perspective of the users, and web contents can be easily changed from the perspective of the developers.

Also, an exemplary embodiment may allow using various web contents through downloading a single web application.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not intended to limit its scope, the exemplary embodiments will be described with specificity and detail taken in conjunction with the accompanying drawings, in which:

FIG. 5 is a flow diagram illustrating a method of providing web contents as provided on a screen of a user device according to an exemplary embodiment.

DETAILED DESCRIPTION OF EXEMPLARY EMBODIMENTS

Figure 1:
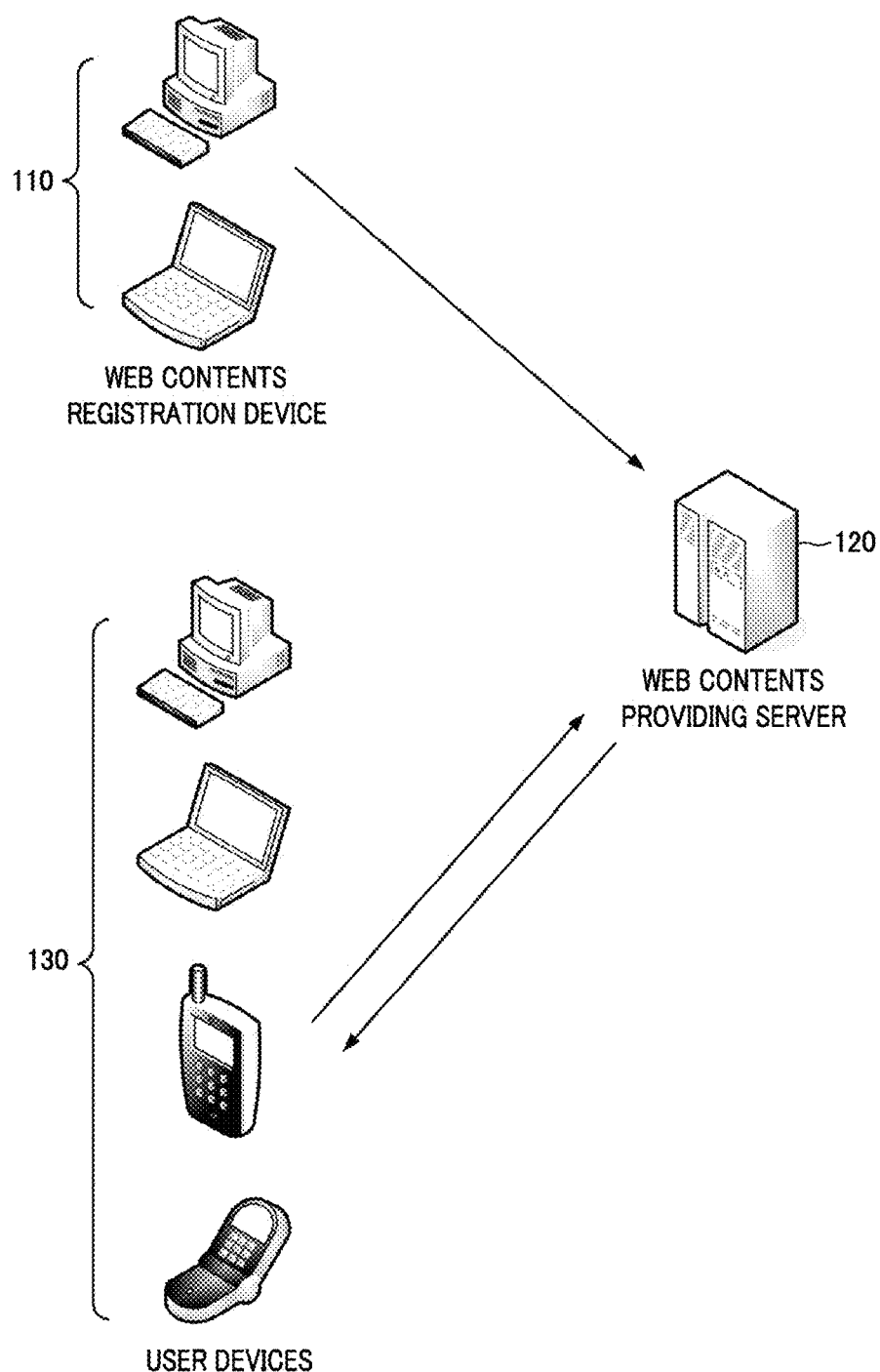
FIG. 1 is a view illustrating a configuration of a system for providing web contents according to an exemplary embodiment.

Hereinafter, exemplary embodiments will be described in detail with reference to the accompanying drawings to be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a view illustrating a configuration of a system for providing web contents according to an exemplary embodiment.

The system for providing web contents according to an exemplary embodiment may include a web contents registration device 110, a web contents providing server 120, and various user devices 130. The web content registration device 110, the contents providing server 120, and the user devices 130, each may include at least a memory and a processor or a microprocessor, a network interface, and optionally, a display screen.

With regard to each of the components, the web contents registration device 110 is connected to the web contents providing server 120 to request registration of web contents for service of the web contents.

To this end, the web contents registration device 110 receives an interface for registration of web contents from the web contents providing server 120, and transmits web contents registration information using the interface to the web contents providing server 120.

Here, the interface may include an input box enabling selection or input of a URL address of a web server for providing the web contents, information about a device capable of using the web contents, authentication information for personal authentication, information about types (categories) of web contents, information about an authority managing the web contents, and so on.

The interface may include a further input box enabling selection or input of information about a country, a territory, and a company, which generate the web contents, and a contents provider (CP) which distributes the web contents.

When information about the registered web contents is updated, the web contents registration device 110 may transmit the updated information to the web contents providing server 120, so that the registered web contents can be updated.

The web contents registration device 110 may include all types of handheld-based mobile devices, which can be connected to the web contents providing server 120 to register web contents or others, e.g., a mobile phone, a smart phone, a personal digital assistant (PDA), and a portable multimedia player (PMP). In addition to these devices, the web contents registration device 110 may include a desktop PC, a tablet PC, a laptop PC, a display device (TV), and a set-up box connected to a display device.

When the web contents providing server 120 connected to the web contents registration device 110 receives a registration request for registering web contents, the web contents providing server 120 provides the web contents registration device 110 with the interface for registering the web contents.

The web contents providing server 120 receives 'web contents registration information' for the registration of the web contents from the web contents registration device 110 and registers the web contents. The web contents providing server 120 may map a URL address and an identification code onto each registered web contents and store the web contents in a web contents DB (not illustrated).

The web contents providing server 120 may extract information for generating the identification codes from the received web contents registration information. The web contents providing server 120 may generate the identification code by combining codes corresponding to the extracted information.

In this case, the web contents providing server 120 may generate a first identification code group and a second identification code group from the extracted information, and combine the generated first and second identification code groups to generate the identification code.

Here, the first identification code group may include at least one of information about a device capable of using the web contents, personal authentication information, information about types (categories) of the web contents, and information about a system storing the web contents. The first identification code group may further include information about a subject that generates the codes, i.e., a subject that manages the web contents.

Hereinafter, the first identification code group will be referred to as a "meta code."

The second identification code group may include information about at least one of a country, a territory, and a company, which generate the web contents, a contents provider (CP) which distributes the web contents, and an idea of the web contents. The second identification code group may further include a meaning-based code such as EPC, SGTIN, and a mobile RFID code.

Hereinafter, the second identification code group will be referred to as a "meaning-based code."

Thereafter, the web contents providing server 120 may generate a web application including icons (first icons) corresponding to the web contents, to which the URL addresses and the identification codes are mapped. The web contents providing server 120 uploads the web application to a place such as to a location in an application store, from which the web application can be downloaded so that users can download and use the web application.

As described above, the identification codes mapped to the registered web contents may be generated based on the web contents registration information, when the request for the registration of the web contents is made. Parts or all of the identification codes may be generated in advance to be mapped to the corresponding web contents upon the registration of the web contents.

Hereinafter, an exemplary embodiment where the identification codes are generated based on the web contents registration information when the request for the registration of the web contents is made will be described in further detail.

When the user device 130 executes certain web contents, the web contents providing server 120 receives identification codes mapped to the corresponding web contents, i.e., the meta code and the meaning-based code, from the corresponding user device selected from among the user devices 130.

Thereafter, the web contents providing server 120 may analyze the meta code and the meaning-based code and store a type of the user device 130 which accessed the web contents, personal authentication information, types (categories) of the web contents, ID of the web contents, and so on. In this way, the web contents providing server 120 may manage 'usage record information' with regard to the web contents used by each user.

The personal authentication information may include at least one of a residential area, an age, hobbies, and a career of the corresponding user, and records indicating information regarding the connection to the web contents.

Thereafter, when a request for download of a customized web (hybrid) application is received from the user device 130, the web contents providing server 120 generates a hybrid application including multiple URL addresses mapped to the web contents, based on the usage record information of the user and identification information of the web contents.

Here, the hybrid application may include URL addresses enabling use of a multiple web contents through one application. When the hybrid application is executed in the user device 130, icons including the URL addresses mapped to the web contents may be displayed.

The web contents providing server 120 may generate icon groups by grouping the multiple icons by categories. The web contents providing server 120 may generate a hybrid application icon including the multiple icon groups, and upload the hybrid application to a location from which the web application can be downloaded such as a location in an application store.

This configuration according to an exemplary embodiment will be described in greater detail with reference to FIG. 5.

In arranging the multiple icons displayed on the screen of the user device selected from among the user devices 130, when selecting the hybrid application, the web contents providing server 120 may arrange the first icons in an order of popularity, by categories, in an order of recent updates, in an order of an amount of sponsor money, or in an order set by the authenticated user.

The user devices 130 are connected to a web server such as an application store that provides a download service for a web application or web contents to download a certain web application corresponding to web contents (first icons) or the hybrid application.

Thereafter, when the downloaded web application is executed, the user devices 130 are connected to the web server that provides the web contents, by using the URL address mapped to the selected icon.

Thereafter, the screen of one of the user devices 130 displays the web contents provided by the web server, and transmits the identification code mapped to the web contents, i.e., the meta code and the meaning-based code, to the web contents providing server 120.

In this case, if the downloaded application is the hybrid application, the screen of the respective user device selected from among user devices 130 displays the icon groups or the icons included in the hybrid application. The respective user device from among the user devices 130 may be connected to the web server that provides the web contents, by using the URL address mapped to the selected icon.

The user device from among the user devices 130 may include all types of handheld-based mobile devices, which can be connected to the web contents providing server 120 or a web server that provides a service like an application store, where a web application or web contents can be downloaded, e.g., to a mobile phone, to a smart phone, to a personal digital assistant (PDA), and to a portable multimedia player (PMP).

In addition to these devices, the user devices 130 may further include a desktop PC, a tablet PC, a laptop PC, and a display device, and a set-up box connected to a display device.

Figure 2:
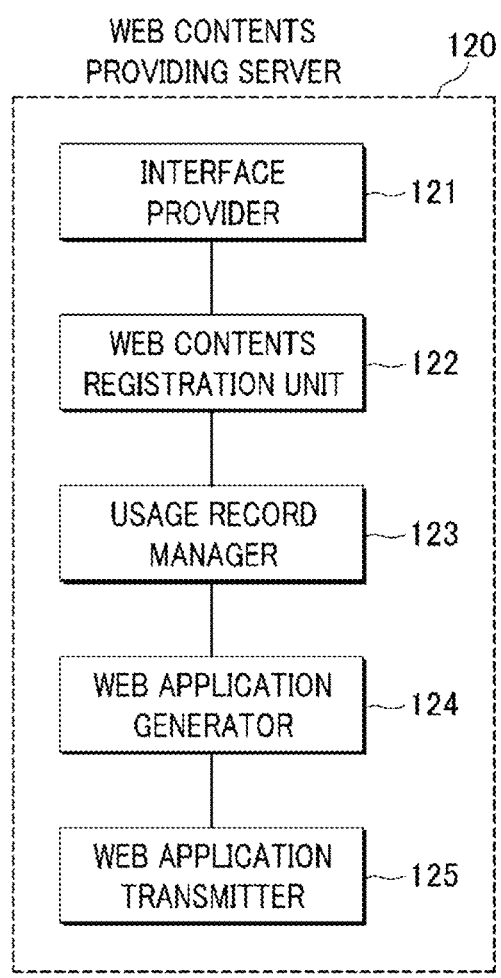
FIG. 2 is a block diagram illustrating a web contents providing server according to an exemplary embodiment.

FIG. 2 is a block diagram illustrating a web contents providing server according to an exemplary embodiment.

The web contents providing server 120 according to an exemplary embodiment includes an interface provider 121, a web contents registration unit 122, a usage record manager 123, a web application generator 124, and a web application transmitter 125.

With regard to each of the components, when the web contents registration device 110 is connected to the web contents providing server 120 to request registration of web contents, the interface provider 121 provides the web contents registration device 110 with an interface for the registration of the web contents.

Since the interface has been described with reference to FIG. 1, description of the interface is omitted hereinafter.

When 'web contents registration information' for the registration of the web contents is received from the web contents registration device 110, the web contents registration unit 122 may register the web contents, and map URL address and identification code to the registered web contents.

To this end, the web contents registration unit 122 may extract information for generating the identification code from the received web contents registration information. An identification code generator (not illustrated) may generate the identification codes by combining codes corresponding to the extracted information.

The web contents registration unit 122 may generate icons corresponding to the registered web contents. In this case, each of the generated icons may be linked to the URL address and the identification code mapped to the registered web contents.

When the icon is selected by one of the user devices 130, the usage record manger 123 may receive user information of the authenticated user and the identification code included in the icon from the one user device. In this way, the usage record manager 123 may manage service usage records for the authenticated user.

The usage record manager 123 may identify contents preferred by each user based on the service usage records for the user.

The web application generator 124 may generate a hybrid application including multiple icons.

The web application generator 124 may further generate icon groups by grouping the multiple icons by pre-set categories, and generate a hybrid application including the multiple icon groups.

For example, web contents that provide information about movies and web contents that provide information about video/DVD rental shops may be included in the same category 'movies.' Web contents that provide information about famous restaurants and web contents that provide food recipes may be included in the same category 'food.'

Accordingly, the web application generator 124 may generate icon groups (second icons) corresponding to 'movies' and 'food,' respectively, and generate a hybrid application including the generated icon groups.

When the hybrid application is executed by one of the user devices 130, the screen of the one user device may display the icon groups classified into the categories movies and food. If the icon group for the food category is selected, the screen of the one user device may display an icon (first icon) corresponding to the web contents providing information about famous restaurants and display an icon (first icon) corresponding to the web contents providing food recipes.

The web application transmitter 125 may transmit the hybrid application generated by the web application generator 124 directly to one or more user devices 130 or a separate web server that provides an application store service, so that users can download the corresponding hybrid application from the application store.

In an exemplary embodiment, each component of the web content providing server 120 as illustrated, by way of an example, in FIG. 2 may be implemented as software, hardware, or a combination thereof. For example, one or more components of the web content providing server 120 may be a field programmable gate array (FPGA) or an application specific integrated circuit (ASIC), and execute a certain function or functions.

However, the 'components' are not limited to the description above. Each of the components may be configured to be software alone stored in an addressable storage medium and/or reproduced by one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables, and the like.

The components and functions thereof may be combined with each other to be a smaller number of components or divided to include additional components.

Figure 3:
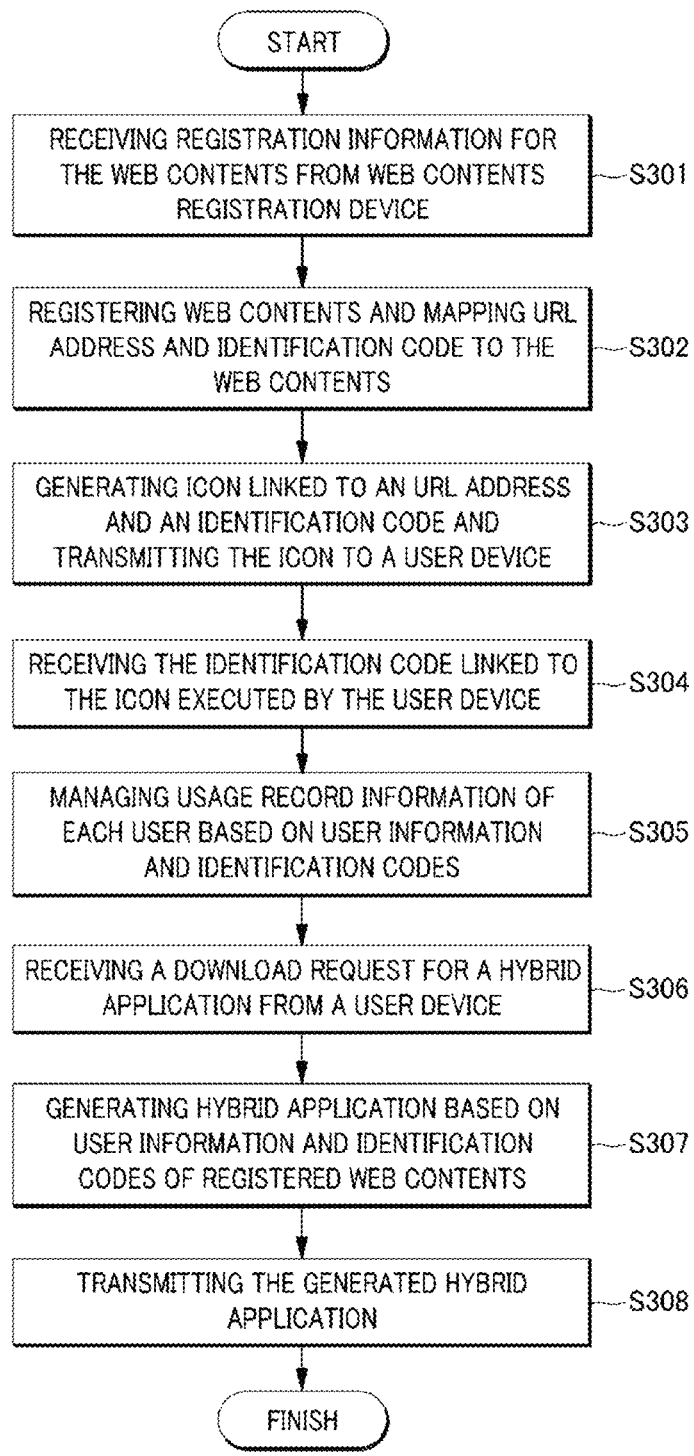
FIG. 3 is a flow chart illustrating web contents providing method according to an exemplary embodiment.

FIG. 3 is a flow chart illustrating web contents providing method according to an exemplary embodiment.

FIG. 3 is a flow chart illustrating the web contents providing server 120 providing the web contents according to an exemplary embodiment. Hereinafter, the flow chart illustrated in FIG. 3 will be described with reference to the components of the system illustrated in FIG. 1 solely for improved understanding of an exemplary embodiment and not by way of a limitation.

First, in operation S301, the web contents providing server 120 may receive the 'web contents registration information' for registering the web contents, from the web contents registration device 110.

In operation S302, the web contents providing server 120 may register the web contents and map URL address and identification code to the registered web contents, and store the mapped web contents.

To this end, the web contents providing server 120 may extract information for generating the identification code from the received web contents registration information. The web contents providing server 120 may generate the identification code including the meta code and the meaning-based code by combining codes corresponding to the extracted information.

In operation S303, the web contents providing server 120 may generate the icon which is linked to the URL address and the identification code.

In operation S304, if icon is selected in one of the user devices 130, the web contents providing server 120 may receive identification code linked to the icon, from the user device 130.

In operation S305, the web contents providing server 120 may analyze the meta code and the meaning-based code and store type of the user device 130 which is using the web contents, personal authentication information, types (categories) of the web contents, ID of the web contents, and so on in the DB, such that the web contents providing server 120 may manage the 'usage record information' with regard to the web contents used by each user.

Here, the personal authentication information may include at least one of a residential area, an age, hobbies, and a career of the corresponding user, and records indicating connection history for connecting to a web application.

In operation S306, the web contents providing server 120 may receive a request to download a hybrid application from one of the user devices 130.

In operation S307, the web contents providing server 120 may generate a hybrid application including the multiple icons based on the usage record information of the corresponding user, and the identification codes of the registered web contents.

In this case, the web contents providing server 120 may generate icon groups (second icons) by grouping the multiple icons by categories and generate a hybrid application which includes the multiple icon groups.

In operation S308, the web contents providing server 120 may transmit the generated hybrid application to one or more of the user devices 130 or to a separate web server that provides an application store service.

If the hybrid application is transmitted to a separate web server that provides an application store service, one or more of the user devices 130 may be connected to the corresponding web server to download the hybrid application.

Figure 4:
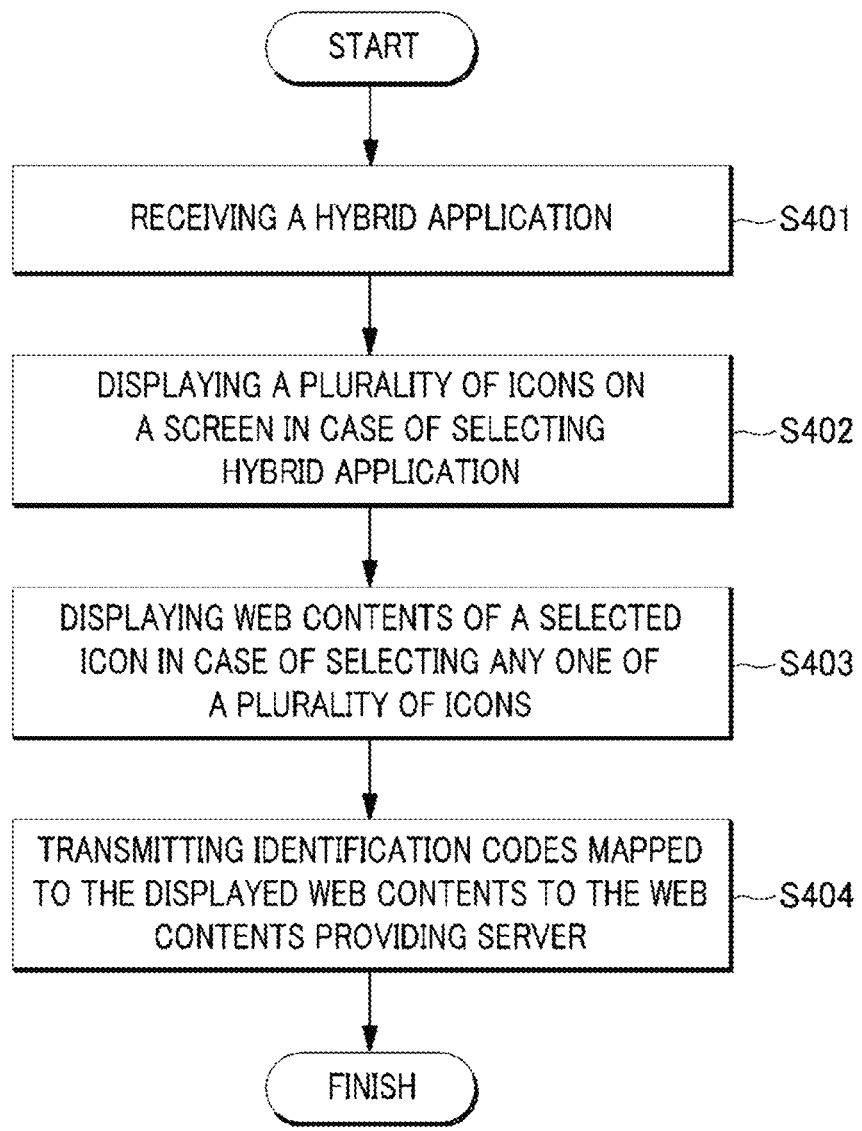
FIG. 4 is a flow chart illustrating web contents providing method according to another exemplary embodiment.

FIG. 4 is a flow chart illustrating web contents providing method according to another exemplary embodiment.

FIG. 4 is a flow chart illustrating the web content provided by one or more of the user devices 130. Hereinafter, the flow chart in FIG. 4 will be described with reference to the components of the system illustrated in FIG. 1 solely for improved understanding of an exemplary embodiment and not by way of a limitation.

First, in operation S401, one or more of the user devices 130 connected to the web server that provides a web application service such as an application store may receive a hybrid application.

In operation S402, if the received hybrid application is executed, the screen of the one or more of the user devices 130 may display the multiple icons included in the hybrid application.

In operation S403, when any one of the multiple icons displayed on the screen of the one or more user devices 130 is selected, the screen of the one or more user devices 130 may display the web contents based on the URL address included in the selected icon.

In operation S404, the one or more user devices 130 may transmit the identification code mapped to the displayed web contents, i.e., the meta code and the meaning-based code, to the web contents providing server 120.

FIG. 5 is a flow diagram illustrating a method of providing the web contents as provided on a screen of a user device according to an exemplary embodiment.

One or more of the user devices 130 may download the hybrid application from the application store.

Thereafter, if the downloaded hybrid application is selected, the screen of the respective user device may display the multiple icon groups provided by the selected hybrid application.

Thereafter, when any one of the multiple icon groups is selected, the screen of the respective user device may display the multiple icons in the selected icon group.

In this case, the respective user device may display the icons in an order of popularity, by categories, in an order of recent updates, or in an order of an amount of sponsor money.

Thereafter, when any one of the multiple number of icons is selected, the screen of the respective user device may display web contents based on the URL address included in the selected icon.

Exemplary embodiments may be embodied in a transitory or a non-transitory storage medium which includes instruction codes which are executable by a computer or a processor, such as a program module which is executable by the computer or the processor. A data structure according to exemplary embodiments may be stored in the storage medium and executable by the computer or the processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of exemplary embodiments is provided for the purpose of illustration, and it will be understood by those skilled in the art that various changes and modifications may be made without changing a technical conception and/or any essential features of the exemplary embodiments. Thus, above-described exemplary embodiments are exemplary in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of exemplary embodiments. It shall be understood that all modifications and embodiments conceived from the meaning and scope of the claims and their equivalents are included in the scope of the present inventive concept.

What is claimed is:

1. An apparatus for providing web contents, the apparatus comprising:
    a web application generator configured to generate, if a request to download a hybrid application is received from a device of a user, the hybrid application comprising URL addresses corresponding to web contents, wherein the web contents are selected from a plurality of different websites based on user information comprising data indicating characteristics of the user and wherein identification codes are mapped to the web contents; and
    a web application transmitter configured to transmit the generated hybrid application to the device of the user or to a web application providing device.

2. The apparatus of claim 1, the apparatus further comprising:
    a usage record manager configured to manage, when the URL address included in the transmitted hybrid application is loaded into the device of the user, service usage records for the user based on the user information of the user and the identification codes mapped with the loaded URL address.

3. The apparatus of claim 1, wherein the web application generator is further configured to generate icons including respective URL addresses included in the hybrid application, and
    wherein the icons are displayed in an order of popularity, by categories, in an order of recent updates, in an order of an amount of sponsor money, or in an order set by the authenticated user.

4. The apparatus of claim 1, further comprising a web contents registration unit configured to register a plurality of web contents, and configured to map the URL address and an identification code onto each of the registered plurality of web contents,
    wherein when information about the registered web contents is updated, the web contents registration unit is configured to update the registered web contents.

5. The apparatus of claim 4, wherein the web application generator is further configured to generate the hybrid application including updated URL addresses.

6. The apparatus of claim 1, further comprising a web contents registration unit configured to register a plurality of web contents, and configured to map the URL address and an identification code onto each of the plurality of registered web contents,
    wherein the web contents registration unit is configured to extract information for generating the identification codes from registration information of the web contents, and configured to generate the identification codes.

7. The apparatus of claim 6, further comprising:
    an interface provider configured to provide an interface to input the registration information for the registration of the plurality of web contents.

8. A method of providing web contents, the method comprising:
    generating at least two first icons, each comprising a URL address and an identification code corresponding to respective web contents selected from a plurality of web contents based on user information comprising at least one characteristic of a user;
    generating at least one second icon, each of which groups said at least two generated first icons by pre-set categories;
    generating a hybrid application comprising the at least one second icon; and
    transmitting the hybrid application to a user device.

9. The method of claim 8, wherein the generating the at least two first icons comprises for each of the at least two first icons, extracting information to generate the identification code from the registration information of the web contents included in the registration request, and generating the identification code.

10. A method of providing web contents, the method comprising:
    transmitting a request to download a hybrid application comprising URL addresses corresponding to a plurality of web contents, wherein the web contents are selected from a plurality of different websites;
    receiving the hybrid application and an input indicating a selection of the hybrid application;
    displaying a plurality of icon groups provided by the selected hybrid application;
    displaying a plurality of icons included in a selected icon group if one of the plurality of icon groups is selected; and
    receiving a web page corresponding to a URL address mapped to a selected icon and displaying the web page if one of the plurality of icons is selected,
    wherein the web contents are selected from the plurality of different websites based on user information comprising data indicating characteristics of the user and identification codes of the web contents.

11. The method of claim 10, wherein the request to download is transmitted to a first server and the hybrid application is received from the first server,
    wherein the plurality of icon groups, the plurality of icons, and the web page are displayed on a screen of a user device,
    wherein the webpage is received from a second server, and wherein the user device is a mobile user terminal.

12. The method of claim 8, wherein the at least two first icons are each generated if a request to register the respective web contents is received from another user device.

13. The method of claim 8, wherein the generating the at least one second icon comprises generating a plurality of second icons, each of which indicates a category to group at least two of the generated first icons.

14. The method of claim 8, wherein the hybrid application is generated based on user information and the respective identification code for each of the registered web contents and wherein the hybrid application is generated in response to receiving a download request to download the hybrid application from the user device.

15. The apparatus of claim 2, wherein the usage record manager stores types of user devices that belong to the user, which has been authenticated and wherein the identification code comprises meta code and meaning-based code and wherein the meta code comprises information about a device capable of using the corresponding web contents, personal authentication information, information about categories of the web contents, and information about a system storing the web contents, and information about a subject that manages the web contents, information about at least one of a country, a territory, a company, which generate the respective web contents, and a contents provider which distributes the respective web contents and wherein the meaning-based code comprises at least one of EPC, SGTIN, and a mobile RFID code.

16. The apparatus of claim 1, wherein the web application generator is further configured to generate an icon identifying each of the selected web contents and one additional icon identifying the hybrid application comprising the generated respective icons.

17. The apparatus of claim 16, wherein the web application generator is further configured to group the selected web contents into categories and generate an additional icon for each of the categories.

18. The apparatus of claim 1, wherein the characteristics of the user comprises at least two of a residential area, an age, hobbies, and a career of the corresponding user, and records indicating information regarding the connection to the web contents.

19. The method of claim 10, wherein the identification codes of the web contents identify user devices that are capable of displaying the corresponding web contents.

\* \* \* \* \*